March 28, 1950     L. M. SHERMAN     2,501,745
GAUGE FOR ANGULAR MEASUREMENTS
Filed Sept. 16, 1946
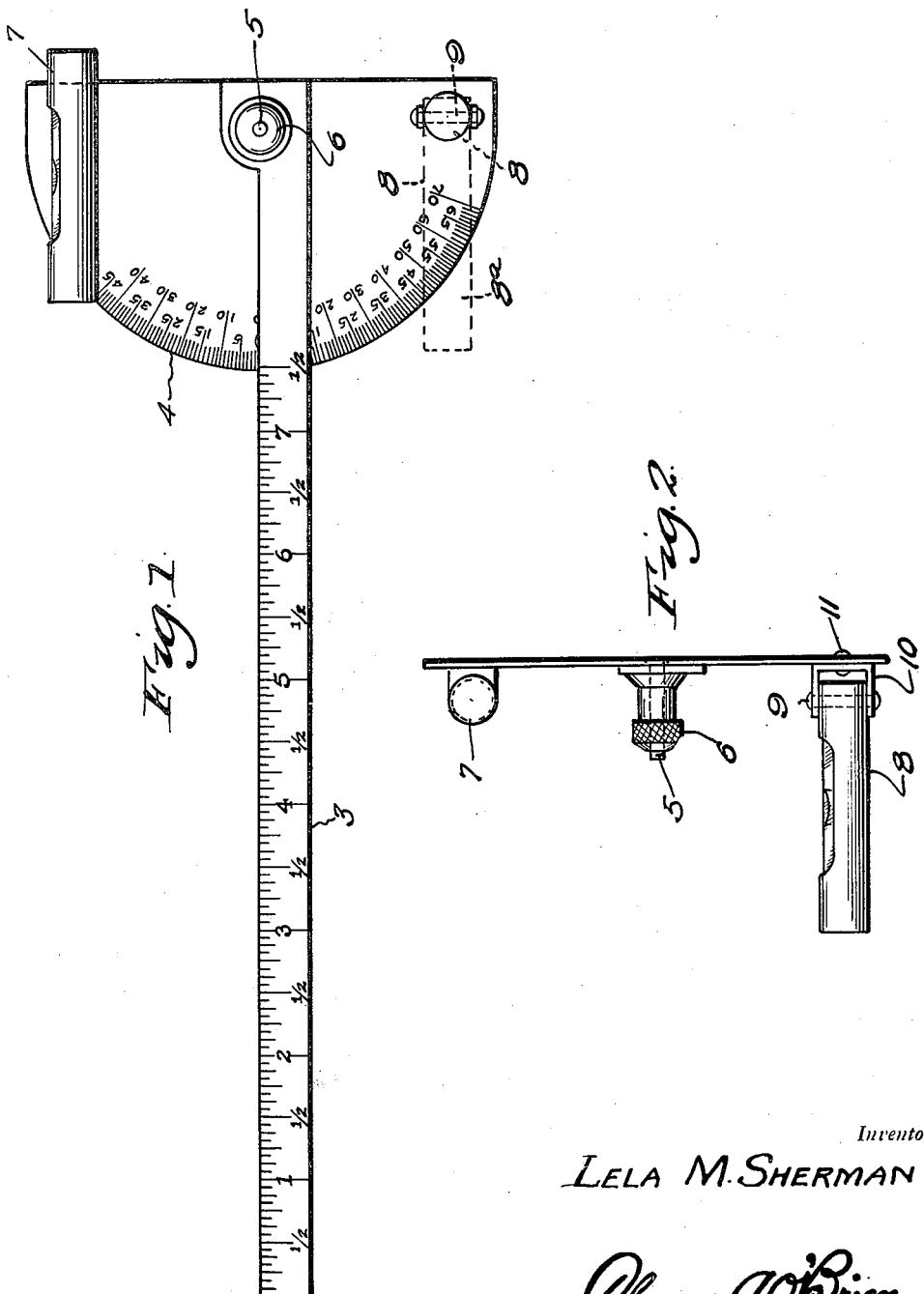
Inventor
LELA M. SHERMAN Patented Mar. 28, 1950

2,501,745

UNITED STATES PATENT OFFICE 2,501,745

GAUGE FOR ANGULAR MEASUREMENTS

Lela M. Sherman, Dewey, Ill.

Application September 16, 1946, Serial No. 697,256

4 Claims. (Cl. 33—88)

This invention relates to gauges for determining angles, bevels and the like and it has for its special object to provide a gauge permitting to measure or to check the angle at which members or parts of a body are set with respect to said body or to an axis of the same or with respect to other members.

The invention essentially comprises a ruler or other member adapted to be aligned along a line of the body to be measured or along an ideal line thereof, and of a protractor pivoted to said rule, the position of which in space, with respect to a plane, such as the horizontal or vertical plane which is fixed in space, may be accurately determined. This is preferably done by means of two levels of the conventional type, one of which is mounted on the protractor with its axis and its indicating plane passing through the center mark of the level arranged in parallelism to the protractor plane, while the other level is rotatably mounted on the protractor by means of a pivot, the axis of the level being movable in a plane at right angle to the protractor plane.

This arrangement is preferably obtained by fixing one of the two levels directly to the protractor while the other protractor is pivoted to a support for free semi-circular movement, the said support being then attached to the protractor in such a manner that the axis of the pivot is parallel to the protractor plane. The indicating planes of the two levels which pass through the axis and through the center mark of the bubble may therefore intersect at right angle if the second level is turned into a corresponding position. The indicating marks of the two levels are facing the same side.

This arrangement will permit to measure or check angular relations between a line and a fixed plane such as the horizontal or vertical plane or between two such lines on the same body.

The invention is illustrated in the accompanying drawing, showing one embodiment thereof. It is however, to be understood that the specific embodiment which has been illustrated is merely a preferred example, serving to illustrate the principle on which the invention is based, and its application in a specific case. It will be obvious to the expert skilled in this art from the following specification, that the application of the same principles may result in other modifications without any departure from the essence of the invention.

In the drawing,

Figure 1 is a plan view, and

Figure 2 is a side view of the gauge according to the invention.

In order to understand more clearly the purpose of the arrangement let it be assumed as an example that the so-called angle of attack on a model airplane has to be measured. In such a model there is no clear line of reference, with which the measurement can be made. The best line of reference is the longitudinal axis of the plane, which as a rule is an axis of symmetry. If the inclination of this line with say the horizontal is determined and if then the inclination of the chord which is drawn below the curved wings of the plane is determined with reference to the horizontal plane, the "angle of attack" of the wings results from the difference between the two measurements.

Other measurements are carried out in a similar manner.

The gauge consists in a rule 3 provided with a protractor 4 which is secured to the rule by means of a pivot 5 formed by a screw threaded bolt projecting from the protractor. It may be riveted thereto or secured in any other manner.

The screw threaded bolt carries a milled or knurled nut, which serves as a frictional means for securing the protractor to the nut in a desired position.

Levels 7, 8 of the conventional gas bubble type, are mounted on the protractor on both sides of the rule 3. Level 7 is fixed directly to the protractor, with its axis substantially in parallelism to the rule 3. Its indicating plane, that is the plane passing through the axis of the level and through the mark around which the bubble is centered in its indicating position, is therefore parallel to the protractor plane. Level 8, as shown in Figure 2 is mounted on a pivot 9 fixed in a bail or U-shaped holder 10, which in its turn, is fixed on the protractor by means of a rivet 11. Preferably the pivot axis, as shown in the drawing, is coincident with the indicating plane of the first level 7 or is parallel thereto. It may therefore be turned around the pivot and it may be placed at right angle to the first mentioned level 7. The indicating marks of both levels are facing the same side. When not in use it occupies the position 8a shown in dotted lines in Figure 1.

If now, for instance, to return to the example given above, the "angle of attack" of an airplane model is to be measured, or any other angle, such as the angle at which the wings are attached, at which the stabilizer or parts of the engine are mounted, is to be checked or to be determined, it is first necessary to find a line of reference such as the longitudinal axis of the model plane.

Two points can be determined as, in general, the axis is an axis of symmetry. By measuring the width in the fore and aft part in any desired manner, and by halving the width two points are found which are located in the desired plane. The rule is now applied in such a way that it connects these points and the angle of the position of the rule to the horizontal is measured by means of the two levels, which are placed so as to be at right angle to each other. The angle is thus easily determined with great accuracy. To determine the "angle of attack" or in other words the angle at which the wings are set with respect to the body of the model plane, the rule is now placed along the chord connecting the two outer points of the curved wings. Again the levels are used at right angle to each other to measure the angle of the rule with the horizontal line. The relative angle of axis and wings is then easily determined by taking the angular difference between the two measurements.

The above description is only to be taken as an example. It will be clear that the nature of the measurement has no bearing on the invention which consists in providing a rule or other pointing member which may be aligned along one line of the body to be measured with a protractor whose position with respect to an independent plane such as a horizontal or vertical plane may be easily established, so that the angle with respect to said independent plane becomes accurately measurable.

It will be clear that certain constructional changes will not affect the invention.

I claim:

1. A gauge for measuring or checking angles, comprising a protractor, a rule pivotally connected with it and movable in the protractor plane, and means, including two levels, for indicating the horizontal position of a plane at right angle to the protractor plane, one level being fixed to the protractor in substantial parallelism to the same and the other being held by the protractor and projecting from the same in a plane which is perpendicular to the protractor plane and parallel to the axis of the second level.

2. A gauge for measuring or checking angles, comprising a protractor, a rule pivoted to the center of the same, a level attached to said protractor, with its indicating plane in substantial parallelism to the same, mounted for indicating the horizontal position of a line in the protractor plane and a second level, projecting outwardly in a plane which is perpendicular to the plane of the protractor, and parallel to the axis of the first named level, both levels cooperating to indicate the horizontal position of a plane intersecting the protractor plane at right angles.

3. A gauge for measuring angles comprising a rule, a protractor provided with a scale pivoted to said rule, means for fixing the relative position of said protractor and said rule, a level directly and fixedly attached to said protractor, mounted for indicating the horizontal position of a line located in said protractor plane, a support projecting from the protractor plane, a pivot pin carried by said support with its axis in substantial parallelism to said protractor plane, a second level mounted for rotation around said pivot pin and adapted to be turned to an angular position with respect to the protractor plane with its axis moving in a plane which is perpendicular to the protractor plane, said level being adapted to indicate the horizontal position of a plane intersecting the protractor plane at right angles and said two levels cooperating to indicate the exact position of a horizontal plane at right angles to the plane of the protractor plane.

4. A gauge for measuring angles comprising a rule, a protractor provided with a scale pivoted to said rule, means for fixing the relative position of said protractor and said rule, a level fixedly and directly attached to said protractor on one side of the rule, with its axis and its indicating plane in parallelism to the protractor plane, a second level pivotally mounted on said protractor on the other side of the rule, for movement around an axis located in the indicating plane of the first named level, said second level being thus mounted for a movement of its axis in a plane perpendicular to the protractor plane, the indicating openings of both levels facing in the same direction, said two levels cooperating to indicate the exact horizontal position of a plane intersecting the protractor plane at right angles.

LELA M. SHERMAN.

REFERENCES CITED

The following references are of record in the file of this patent:

UNITED STATES PATENTS

| Number | Name | Date |
|---|---|---|
| 92,927 | Amory | July 27, 1869 |
| 284,427 | Hutton | Sept. 4, 1883 |
| 769,226 | Moffett et al. | Sept. 6, 1904 |
| 1,186,063 | Arkin | June 6, 1916 |
| 1,474,652 | Temperli | Nov. 20, 1923 |
| 1,597,357 | Godfrey | Aug. 24, 1926 |

FOREIGN PATENTS

| Number | Country | Date |
|---|---|---|
| 5,913 | Great Britain | 1887 |
| 46,556 | Denmark | Nov. 28, 1932 |